July 3, 1928.
O. R. McDONALD
AUTOMOBILE BUMPER
Filed Oct. 16, 1926
1,675,458
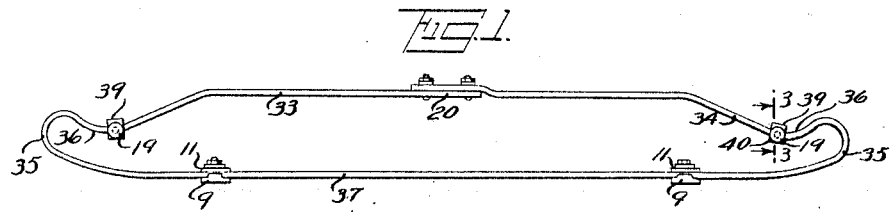
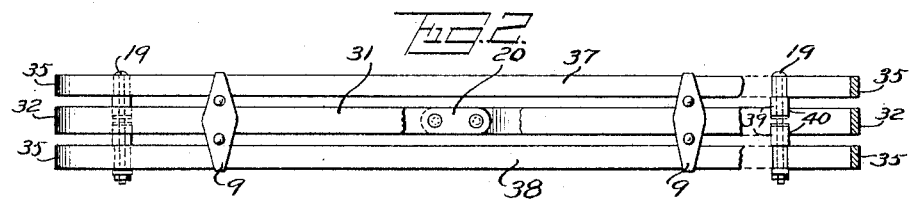
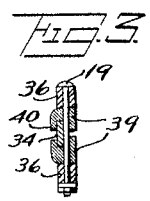
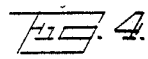
INVENTOR
OLIVER R. McDONALD
BY
Frederick S. Duncan, ATTORNEY Patented July 3, 1928.

1,675,458

UNITED STATES PATENT OFFICE.

OLIVER R. McDONALD, OF BRIDGEPORT, CONNECTICUT, ASSIGNOR TO AMERICAN CHAIN COMPANY, INC., A CORPORATION OF NEW YORK.

AUTOMOBILE BUMPER.

Application filed October 16, 1926. Serial No. 141,897.

This invention relates to automobile bumpers, and more particularly to a multi-bar bumper, having as a main element a loop end bumper bar constructed entirely in one horizontal plane, and having a front impact portion and a rearwardly positioned attaching portion, the bumper comprising also a plurality of auxiliary bars supported by and in parallelism with the said front portion of the main bar, serving to widen the impact surface of the bumper.

A further object is to provide a multi-bar bumper, thus constituted of main and auxiliary bars, in which the auxiliary bars have loop ends so formed in a contour with the end loops of the main bar, and so connected therewith as to afford a high degree of resistance to damage by hooking, and at the same time present a pleasing appearance.

Among other objects of the invention is a provision of a multi-bar bumper in which the means for inter-connection of the component bars with each other are so organized as to permit the production of a multi-bar bumper of exceptional strength, at an expense very little in excess of the cost of the basic main element, but with all the advantages of certain other bumpers of more elaborate and costly construction of the multi-bar type.

A clear conception of the construction and objects of the invention may be had from the following description in conjunction with the accompanying drawings, in which:

Fig. 1 is a plan view of the bumper.

Fig. 2 is a front view of Fig. 1.

Fig. 3 is a cross section view through 3—3 of Fig. 1.

Fig. 4 is a detail of Fig. 3.

In the illustrated embodiment the reference character 31 designates the main bar of the bumper, having loop ends 32, and a rear bar 33 joined at 20 to form a connecting and supporting means for the bumper.

Parallel to main bar 31 and in the same vertical plane are auxiliary bars 37 and 38, which are supported above and below bar 31 by spacing elements or clamps 9. The rear bar 33 is formed by bending main bar 31 in the same horizontal plane to form loop ends 32 and the ends of the extensions are then overlapped and bolted at 20.

Near each end of bar 31 is a re-entrant curved portion 34 to which are secured end loops formed in extensions 35 of auxiliary bars 37 and 38 which conform in contour with the end loops 32 of the main bar, and the extremities 36 of the auxiliary bars are formed with eyes through which bolt 19 is passed. Bolt 19 is provided with spacing members preferably formed by collars 39 having projections 40 which engage the portion 34 of the main bar and hold the respective loops in assembled relation. Fig. 4 is a detail of the collar 39.

I claim:

1. An automobile bumper comprising as a main element a complete loop end bumper bar, a pair of auxiliary bars having short loop ends terminating in eyes, spacing members for engagement with said main bar, and means for aligning said eyes with said spacing members.

2. An automobile bumper comprising as a main element a complete loop end bumper bar, a pair of auxiliary bars having short loop ends of substantially the same curvature, the loop ends of said auxiliary bars terminating in eyes, spacing members between said main and auxiliary bars having frictional engagement with said main bar at a point in vertical alignment with said eyes and means for assembling said eyes and said spacing members in an integral unit.

3. An automobile bumper comprising as a main element a complete loop end bumper bar, a pair of auxiliary bars having short loop ends of substantially the same curvature, the loop ends of said auxiliary bars terminating in eyes, spacing members for engagement with said main bar, and means for aligning said eyes with said spacing members.

4. An automobile bumper comprising as a main element a complete loop end bumper bar, a pair of auxiliary bars having short loop ends terminating in eyes, a pair of spacing collars having lugs thereon for frictional engagement with said main bar, said auxiliary bars being clamped in vertical alignment with said main bar by a bolt passing through said eyes and said spacing collars.

In testimony whereof, I have signed this specification.

OLIVER R. McDONALD.